WILLIAM A. RAY
INVENTOR

WILLIAM A. RAY
INVENTOR

BY
ATTORNEY

United States Patent Office 3,481,363
Patented Dec. 2, 1969

3,481,363
COMBINATION PRESSURE REGULATOR AND SHUTOFF VALVE
William A. Ray, North Hollywood, Calif., assignor to International Telephone and Telegraph Corporation, New York, N.Y., a corporation of Delaware
Filed Aug. 18, 1967, Ser. No. 661,620
Int. Cl. G05d 16/20
U.S. Cl. 137—495                    8 Claims

ABSTRACT OF THE DISCLOSURE

The invention comprises a pressure regulator, and a releasable spring which can overcome the opening force of the regulator to close the regulator valve when released.

BACKGROUND OF THE INVENTION

This invention relates to pressure regulators, and more particularly to a mechanism selectively actuable to open or to close a regulator valve.

In the past it has been the practice to provide a shutoff valve separate and apart from the valve of a pressure regulator. Due to the fact that a pressure regulator usually employs a device which at least partially closes a communicating orifice to provide the desired pressure regulation, the device and the shutoff valve at least partially perform duplicate functions. Further, a rather large solenoid is required for the shutoff valve to overcome the closing force on the valve created by the line pressure.

SUMMARY OF THE INVENTION

In accordance with the device of the present invention, the above described and other disadvantages of the prior art are overcome by providing selectively operable means for overcoming the opening force of a pressure regulator. Thus, the same device which is incorporated in the regulator for adjusting the opening in an orifice for pressure regulation, is also employed as a shutoff valve. The shutoff valve therefore performs two functions. It provides both pressure regulation and shutoff.

In accordance with another important feature of the invention, the shutoff force is provided by means including an electric motor operated hydraulic pump. A strong shutoff spring closes the valve. It is, however, possible to overcome the large shutoff spring force to open the valve by the use of a small, low power electric motor because hydraulic amplification is provided.

It is also another important feature of the present invention that means are provided for connection with the valve to close the valve wherein the connection means does not force the valve to move in any direction except that to close the valve. In this manner the diaphragm of the regulator is protected against damage.

The above-described and oher advantages of the present invention will be better understood from the following description when considered in connection with the accompanying drawings.

DESCRIPTION OF THE PREFERRED EMBODIMENT

Figure 1:
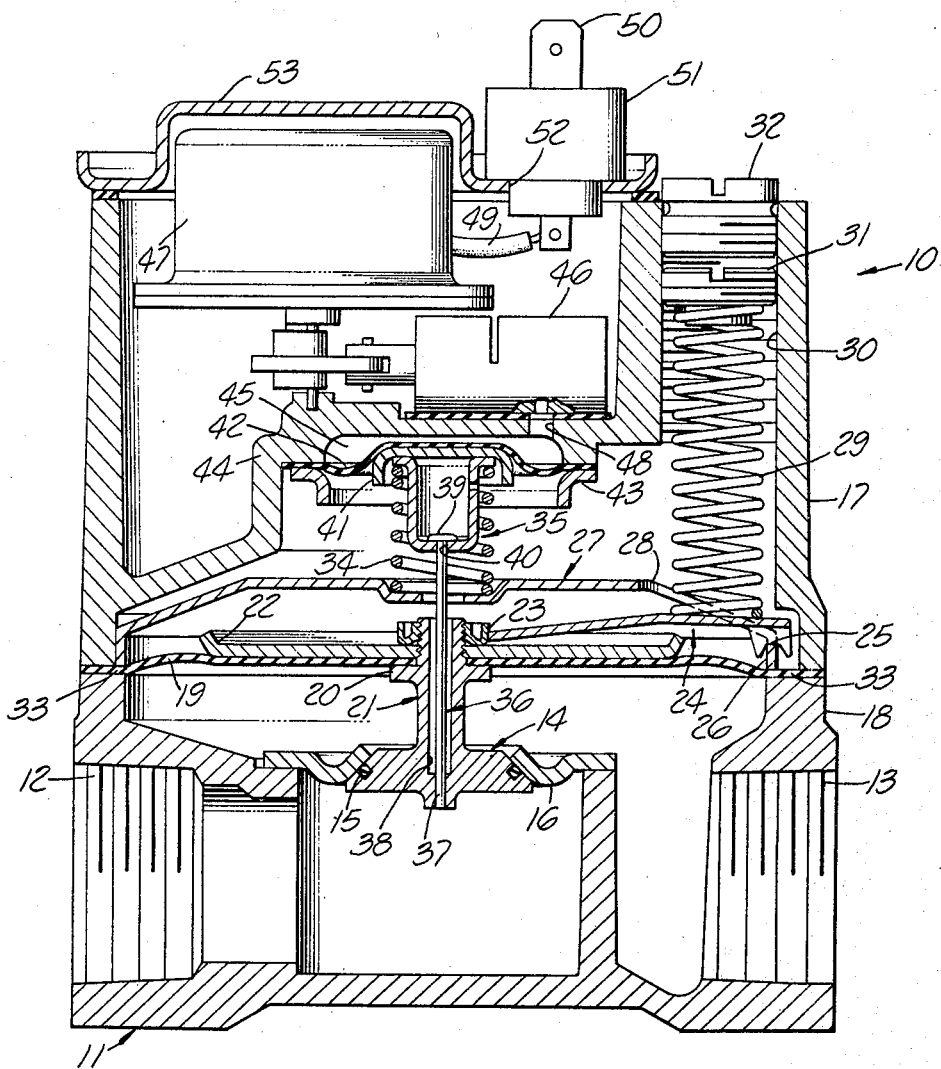
FIG. 1 is a vertical sectional view through the combination pressure regulator and shutoff valve constructed in accordance with the present invention.

In the drawing in FIG. 1 a combination pressure regulator and shutoff valve 10 constructed in accordance with the present invention is shown including a body 11 having an inlet port 12, and an outlet port 13. The device 10 also includes a valve 14 having a resilient O-ring 15 thereon to seal with a valve seat 16 fixed to body 11.

Body 11 has an upper portion 17 and a lower portion 18 which are fixed together by conventional means, such as bolts and flanges. A diaphragm 19 is fixed between portions 17 and 18. Diaphragm 19 is fixed between a flange 20 on a valve stem 21 of valve 14, and a reinforcement plate 22. Plate 22 is fixed relative to stem 21. A washer 23 extends around the upper end of stem 21. Washer 23 may be slidable over stem 21 and fixed thereto, if desired.

A lever 24 bears on washer 23. Lever 24 has a fulcrum at 25 on a circular edge 26 of a partition plate 27 that has a circular hole 28 therethrough to receive a helically coiled spring 29.

Spring 29 is retained in a threaded hole 30 of body 11. The compression of spring 29 is adjusted by a screw 31 threaded to hole 30. A plug 32 closes the upper end of hole 30. Body portion 18 has a small shoulder 33 on which partition 27 rests.

Valve 14 is closed by a helically coiled spring 34. Spring 34 provides a closing force greater than the opening force of spring 29. Thus, spring 29 acts as the pressure regulator spring.

Spring 34 closes valve 14 by urging follower 35 upwardly. A thin wire 26 is fixed to valve 14 at 37. Wire 36 extends from the follower 35 downwardly through a hollow space 38 in stem 21. Wire 36 has an enlarged head 39 which extends over the top of follower 35. Follower 35 has a hole 40 through which wire 36 is slidable. A reinforcement plate 41 is fixed to the upper end of follower 35. Plate 41 is moved downwardly by a diaphragm 42 fixed between a ring 43 and a partition 44 in valve body 11. Ring 43 compresses the edges of diaphragm 42 against partition 44 and may be cemented to partition 44 at its edges, if desired.

A hydraulic fluid occupies the space 45 between diaphragm 42 and partition 44. Hydraulic fluid is supplied to space 45 by a pump 46 that is operated by an electric motor 47 fixed in body 11. Pump 46 is likewise fixed in body 11 and provides hydraulic fluid to space 45 through a hole 48 in partition 44.

Motor 47 has an output lead 40 and an electrical connector 50 which is fixed in an insulator 51. Insulator 51, in turn, is fixed in a hole 52 through a closing plate 53 that is, in turn, fixed to housing 11.

Figure 2:
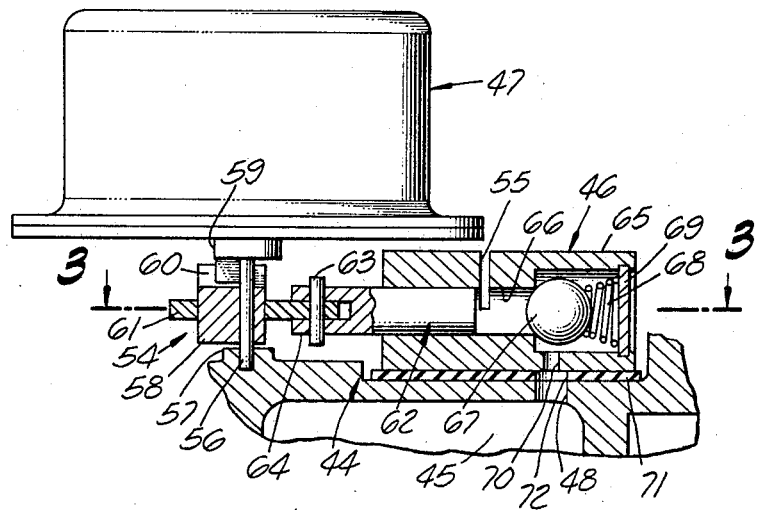
FIG. 2 is an enlarged sectional view of a small hydraulic pump employed with the invention.
Figure 3:
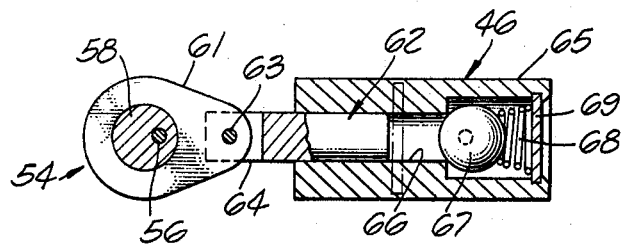
FIG. 3 is a sectional view of an eccentric drive for the pump taken on the line 3—3 shown in FIG. 2.

As shown in FIGS. 2 and 3, hydraulic fluid is supplied to space 45 by a conventional electric motor 47 through a conventional eccentric or pitman 54. Pump 46 has an intake passage 56. Thus, body 11 above partition 44 contains a hydraulic fluid which extends to a level above pump intake opening 55.

Motor 47 has a shaft 56 which is journaled in a boss 57 of partition 44. The housing of pump 47 is therefore fixed to body 11. A cylinder 58 is fixed to shaft 56 by a key 59 that is, in turn, fixed to shaft 56. Key 59 extends into a keyway 60 and cylinder 58. Note will be taken from FIG. 3 that shaft 56 is eccentric with cylinder 58. Cylinder 58 thus drives an ear 61 to reciprocate the pump piston 62 through a pin connection 63. Piston 62 has a clevis 64 at one end as shown in both FIGS. 2 and 3.

Pump 46 has a housing 65 and a chamber 66 which is closed by a ball check valve spring biased against the end thereof by spring 68. Spring 68 fits between ball 67 and an end-plate 69 fixed to the end of the pump body 65. Pump body 65 has an outlet port 70 which lies in communication with port opening 48. A conventional seal 71 is fixed between pump body 65 and partition 44, seal 71 having a hole 72 therethrough which permits hydraulic fluid to flow from pump body 65 into space 45 through opening 48.

In the operation of the combination pressure regulator and shutoff valve of the present invention, a pressure regulator force is supplied to valve 14 by spring 29 through lever 24, diaphragm 19 being subjected to a variable portion of the inlet pressure through valve 14 when valve 14 is at least partially opened.

When it is desired that valve 14 should be closed, the pressure in space 45 may be reduced and spring 34 will close valve 14. Alternatively, valve 14 may be biased normally open by a spring.

When it is desired to open valve 14, motor 47 is energized and hydraulic fluid is forced into space 45 by pump 46 to compress spring 34. Follower 35 then can be moved downwardly to an extent such that head 39 is spaced a substantial distance from hole 40. In the closed position, valve 14 is pulled upwardly by follower 35 engaging head 39 of wire 36.

From the foregoing, it will be appreciated that valve 14 may act both as a pressure regulator valve and as a shutoff valve. A duplication of parts is thereby avoided. Still further, motor 47 can be very small due to the fact that the pressure provided by pump 46 need be very small. This is true because diaphragm 42 may be relatively large in comparison to the size of the pump opening 48. The small output pressure of pump 46 may then provide a large opening force for valve 14 through the power input to open the valve does not have to be very large.

The materials of which the parts are made are conventional. Thus, diaphragm 19 may be flexible or resilient or both. It is therefore desirable to protect diaphragm 19 from damage during operations. Follower 35 provides this protection because wire stem 36 is free to move through hole 40 of cup 35. The flexible wire 36 provides easy alignment of working parts.

Note will be taken that many of the component parts of the combination regulator and shutoff valve of the present invention may be transposed without departing therefrom. For example, the positions of valve seat 16 and diaphragm 19 may be reversed.

If desired, the valve body 11 above diaphragm 19 and below partition 44 may be vented to the atmosphere through hole 30, the set screw 31 and plug 32, in that case being loosely fitted in the threads of hole 30.

What is claimed is:

1. In a fluid flow control device, the combination comprising: a valve body having a seat; valve means movable toward and away from said seat; adjustment means connected to said body to move said valve means in a direction and with a force to provide pressure regulation of fluid; and selectively actuable means for overcoming the force of said adjustment means to close said valve means, said valve body having an inlet chamber and an outlet chamber, said valve seat being disposed between said chambers, said valve being disposed on the inlet chamber side of said valve seat, said adjustment means including a flexible diaphragm fixed to said body at its border in a position forming a wall of said outlet chamber, said diaphragm also forming a wall of an adjoining chamber, said valve means being fixed relative to a central portion of said diaphragm, first spring means to bias said diaphragm toward said valve seat, said selectively actuable means including second spring means to bias said diaphragm away from said valve seat, and link means for connecting said second spring means with said valve, said second spring means providing a greater force than said first spring means.

2. The invention as defined in claim 1, wherein said selectively actuable means includes an auxiliary diaphragm actuable to disable said second spring means and thereby to render ineffective the closing force thereof on said valve, and an electric motor driven hydraulic pump to supply a fluid under pressure to said auxiliary diaphragm to actuate the same.

3. The invention as defined in claim 1, wherein pressure means are provided to render said second means ineffective.

4. The invention as defined in claim 3, wherein said link means is a relatively long thin wire.

5. The invention as defined in claim 4, wherein said spring means includes a follower having a hole therethrough, and wherein said wire has one end fixed relative to said valve and another end slidably extending through said follower hole, said spring having a head on said other end thereof to engage the upper side of said follower.

6. In a fluid flow control device, the combination comprising: a valve body having a seat; valve means movable toward and away from said seat; adjustment means connected to said body to move said valve means in a direction and with a force to provide pressure regulation of fluid; and selectively actuable means for overcoming the force of said adjustment means to close said valve means, said selectively actuable means including first bias means to hold said valve means in its closed position, said adjustment means including second bias means to urge said valve means toward its open position with a force less than that of said first bias means, said selectively actuable means including a diaphragm forming a chamber with said valve body, a pump to force fluid into said chamber, and an electric motor to drive said pump, said diaphragm lying in engagement with said first bias means, said forcing of said fluid into said chamber overcoming the closing force of said first bias means and permitting said second bias means to open said valve means.

7. In a fluid flow control device, the combination comprising a valve body having a seat; valve means movable toward and away from said seat; adjustment means connected to said body to move said valve means in a direction and with a force to provide pressure regulation of fluid; and selectively actuable means for overcoming the force of said adjustment means to close said valve means, said adjustment means including a diaphragm and spring means to bias said diaphragm in a direction to open said valve, said selectively actuable means including force means and link means connecting said force means to said valve means, said force means being actuable to provide a force, stronger than that of said spring means to close said valve means, said link means being slidable in a direction relative to one of said force and valve means, said force means being actuable to stress said link means to close said valve and to relieve the stress on said link means by allowing said slidable movement thereof.

8. The invention as defined in claim 7, wherein said link means is a relatively long thin wire.

References Cited

UNITED STATES PATENTS

| | | | |
|---|---|---|---|
| 48,166 | 6/1865 | Governor | 137—495 |
| 853,503 | 5/1907 | Eddy | 137—495 XR |
| 877,003 | 1/1908 | Schulze | 137—495 XR |
| 2,842,146 | 7/1958 | Schuster | 137—495 XR |
| 3,338,264 | 8/1967 | Dykzeul et al. | 137—505.41 |

M. CARY NELSON, Primary Examiner

R. J. MILLER, Assistant Examiner

U.S. Cl. X.R.

137—505.41